June 5, 1962 — L. L. ZELLE — 3,037,571
WIDE BASE CRAWLER
Filed Aug. 17, 1959 — 3 Sheets-Sheet 1

INVENTOR.
Lester L. Zelle
BY Shoemaker & Mattare
Attys.

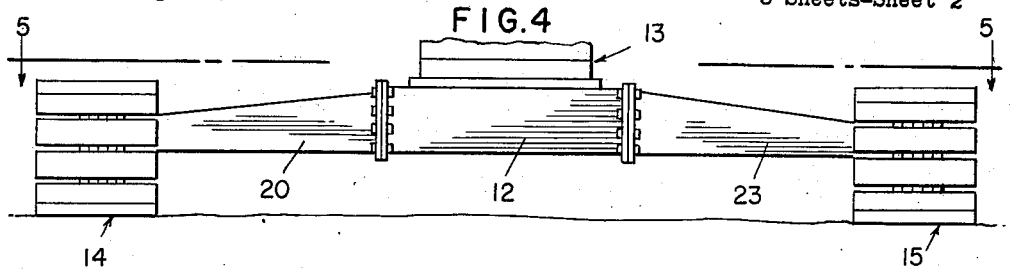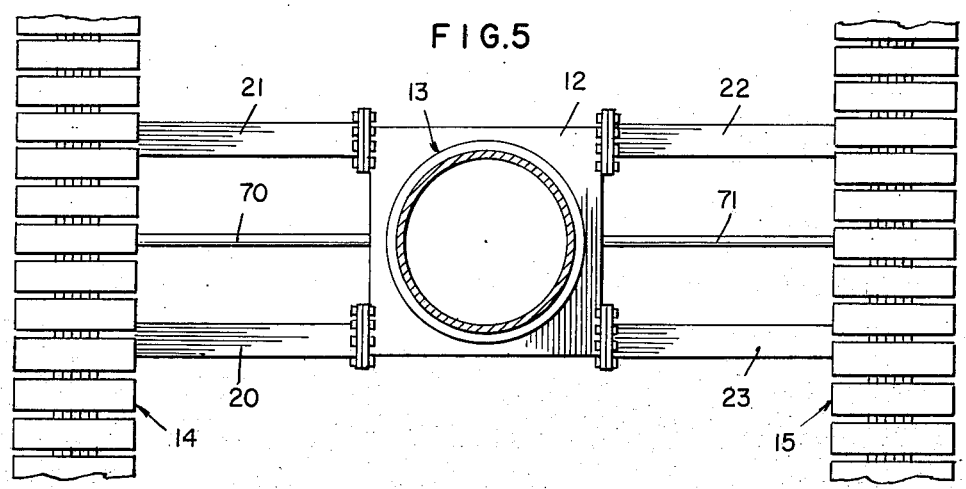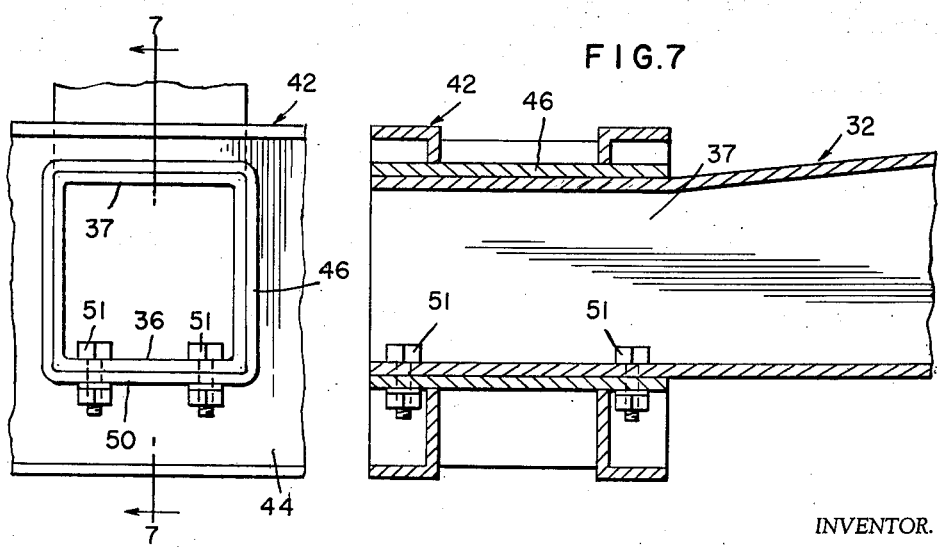

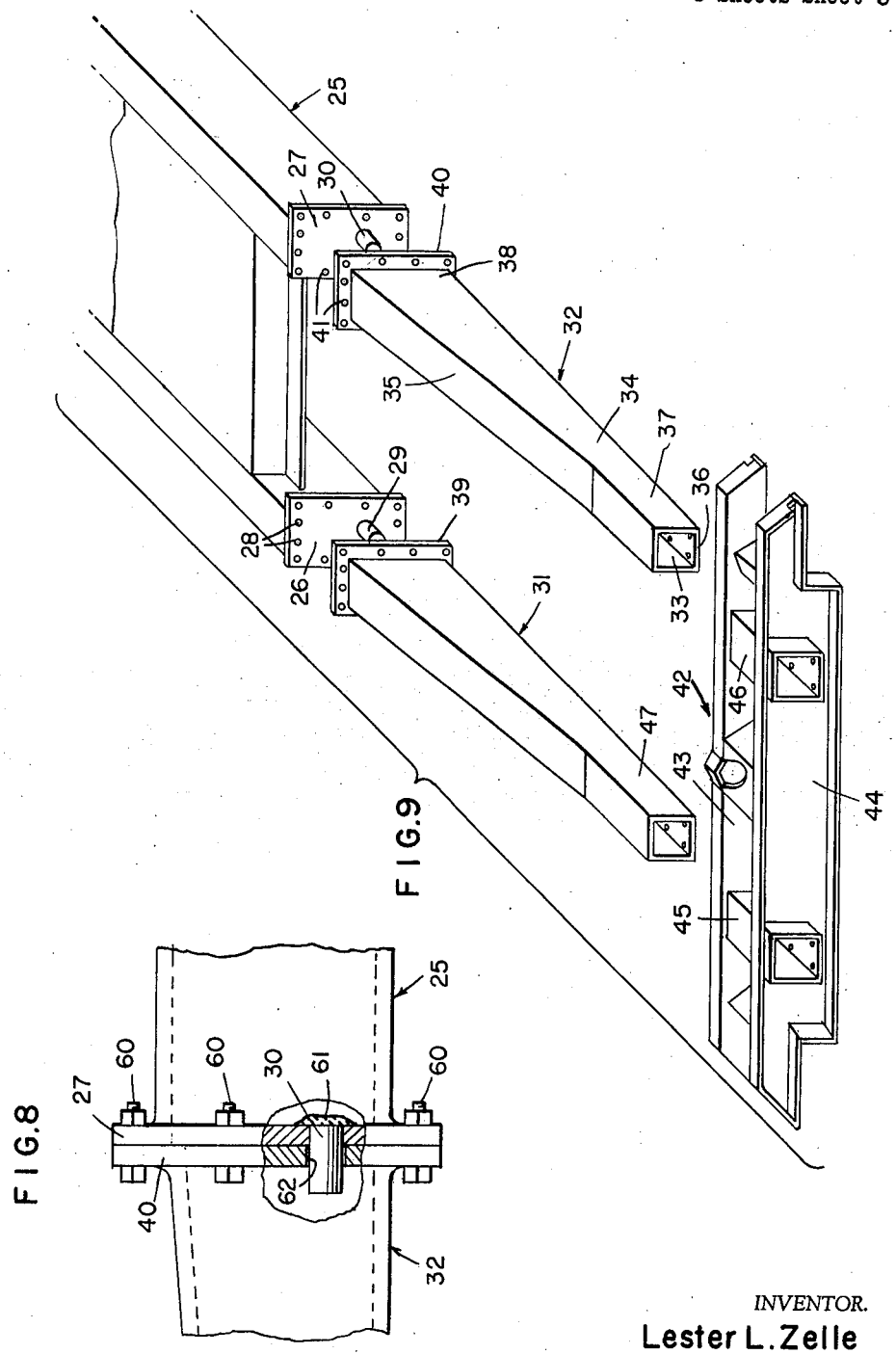

United States Patent Office 3,037,571
Patented June 5, 1962

3,037,571
WIDE BASE CRAWLER
Lester L. Zelle, Waverly, Iowa, assignor to Schield Bantam Company, Waverly, Iowa, a corporation of Iowa
Filed Aug. 17, 1959, Ser. No. 834,340
1 Claim. (Cl. 180—9.48)

This invention relates to endless track vehicles and pertains, more particularly, to mechanism for changing the tread dimensions of such machines.

Not infrequently with certain types of endless track vehicles, it is desirable that these vehicles be capable of straddling ditches or depressions and for movement along the same. This, of course, can be accomplished only within the physical dimensions of the tread of the vehicle as originally designed. However, it is sometimes desirable to have such vehicles straddle ditches or the like which are wider than the normal tread of the vehicle. Therefore, it is also desirable that some means be provided for permitting the tread dimensions of the vehicle to be altered at will so as to accommodate for such situations.

However, extensive experimentation has clearly established that the problem is not as simply solved as might appear at first blush. For example, an obvious solution is to provide some means for laterally extending the frame of the vehicle to carry the endless tracks in laterally spaced relationship as regards the normal location of such treads. However, if any sizable extension is to be made in this manner, very high stress concentrations are produced at the point of coupling of the lateral extensions to the frame of the vehicle and as a consequence, failure of the extensions occurs rapidly at these points. It is, therefore, of primary concern in connection with this invention to provide means for increasing the tread dimensions of an endless track vehicle which is not subject to premature failure or breakage and which will accomplish the desired end results with a minimum of effort in effecting the tread dimension change.

Another object of this invention is to provide means for effecting an increase in the tread dimensions of an endless track vehicle which incorporates laterally extending arms adapted to be attached at their inboard ends to the main frame of the endless track vehicle and being connected at their outboard ends to the track frame so as to laterally position the track frames and, consequently, the tracks in laterally extended position so as to increase the tread of the vehicle above the normal tread thereof.

Another object of this invention is to provide lateral extensions for endless track vehicles to accomplish a tread dimension increase therein wherein the extensions are in the form of arms having plates at their inboard ends which are alignable with corresponding plates on the main frame of the vehicle and wherein there is a shear pin connection between the two plates to absorb shear forces therein, the plates being detachably fastened together by bolts relieved of shearing forces therein by the pin connection between the plates.

A further object of this invention is to provide interconnecting means between the main frame of an endless track vehicle and the track frames thereof which will laterally position the track frames outwardly from the normal position with respect to the main frame and wherein such connections are effected by laterally projecting arms detachably fastened at their inboard ends to the main frame of the vehicle and having telescopic slip fitted connection at their outboard ends to the track frame by means of which the track frames may be easily and quickly laterally positioned outwardly from their normal position relative to the track frame.

Still another object of this invention is to provide a novel combination of track frame and lateral extension therefor whereby the tread of an endless track vehicle may be increased, the track frame embodying hollow, tubular elements therein within which are slip fitted and secured the outboard ends of lateral extension arms whose inner ends, in turn, are provided with means for detachably securing the same to the main frame of the endless track vehicle with which they are associated.

With the above and other objects in view, the invention consists in the construction and novel combination and arrangement of parts hereinafter fully described, illustrated in the accompanying drawings and pointed out in the claim hereto appended, it being understood that various changes in the form, proportions, and minor details of construction, within the scope of the claim, may be resorted to without departing from the spirit or sacrificing any of the advantages of the invention.

In the drawings:

FIG. 4 is an elevational view showing, on an enlarged scale, the lower portion of the main frame of an endless track vehicle, the lateral extensions connected thereto and the track frames and tracks associated therewith;

FIG. 5 is a horizontal section taken substantially along the plane of section line 5—5 in FIG. 4 and showing further the relative position between the extension arms and the frame of the vehicle;

FIG. 6 is an enlarged end view showing the connection between the extension arms and the track frame, showing only a portion of each;

FIG. 7 is a vertical section taken substantially along the plane of section line 7—7 in FIG. 6 illustrating further details of the connection between the outboard ends of the extension arms and the track frames;

FIG. 8 is an enlarged section illustrating the connection between the extension arms and the main frame of the endless track vehicle with a portion of the extension arm and main frame being broken away to illustrate the disposition of the shear pin connection therebetween; and FIG. 9 is an exploded perspective view showing a portion of the main frame of the vehicle as well as the mounting plates thereon and shear pins carried thereby, the lateral extension arms disposed at each side of the vehicle and the track frames.

Figure 1:
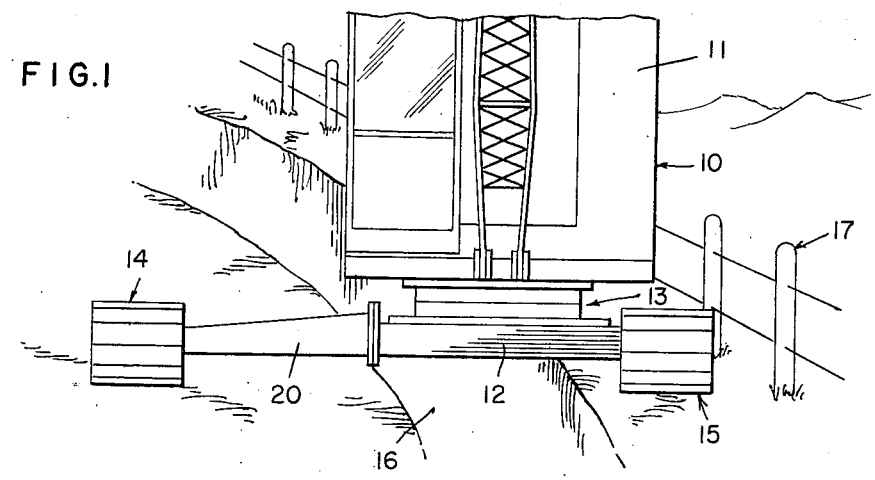
FIG. 1 is a view illustrating one use of the lateral extension in connection with an endless track vehicle and showing the extensions utilized on one side only of the vehicle.
Figure 2:
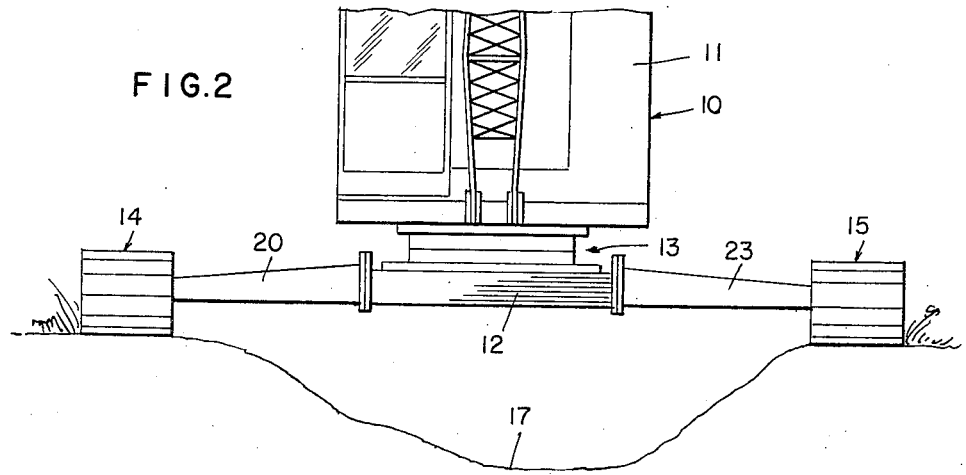
FIG. 2 is a view similar to FIG. 1 but showing the extensions used on both sides of the endless track vehicle and in position of maximum extension so as to straddle a very wide ditch or depression.
Figure 3:
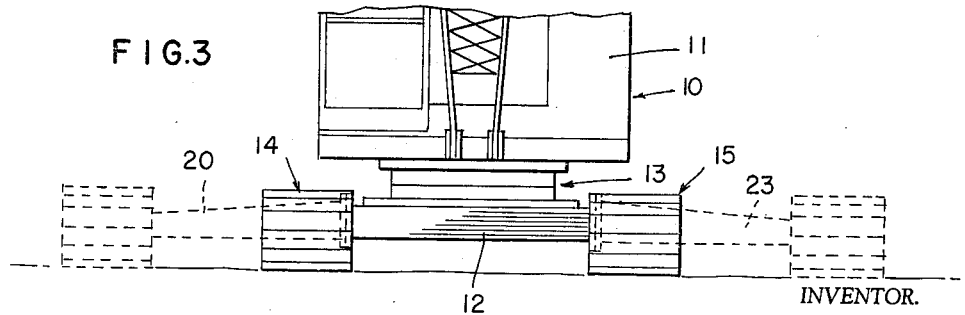
FIG. 3 is a front elevational view showing the tracks and track frames in their normal position in full lines, and showing in dotted lines the maximum extension for the tracks.

Referring now more particularly to FIGS. 1-3, shown therein and indicated generally by the reference character is an endless track vehicle which, in the particular case shown, includes a body or cab 11 housing the prime mover and necessary power transmission means associated with the vehicle and a compartment within which the operator is stationed. There is provided a main frame 12 for the vehicle upon which the body 11 is mounted through the medium, as is conventional, of a turntable assembly indicated generally by the reference character 13.

The main frame 12 carries endless track assemblies indicated generally by the reference characters 14 and 15 in FIG. 3 which, in this figure, are illustrated in their normal position relative to the main frame of the vehicle. FIG. 3 also serves to illustrate the endless tracks in their fully extended positions, these positions of the endless tracks being illustrated in FIG. 3 by dotted lines. From this, it will be evident that the instant invention, which permits of this lateral extension of the track assemblies, is effective to materially increase the tread dimension of the vehicle and thus allow the machine to be supported between widely separated points of support.

FIGS. 1 and 2 serve to illustrate two conditions under which the lateral extensions are useful. In FIG. 1, the vehicle is shown straddling a trench indicated by the reference character 16 which is disposed outboard a fence line indicated generally by the reference character 17 so that the track 15 need not be extended relative to the vehicle main frame, whereas the other track 14 is extended to assure that the vehicle is capable of straddling the trench at all times.

FIG. 2, on the other hand, illustrates both tracks 14 and 15 in their extended position for the purpose of straddling an extremely wide ditch or trench 17.

In this manner, the vehicle can straddle depressions, trenches or ditches while performing work without danger of sinking into the trenches or ditches or caving in the sides thereof.

As shown in FIGS. 4 and 5, the extension of the track frames and their associated endless tracks is accomplished by the utilization of a pair of extension arms 20, 21 and 22, 23 on each side of the vehicle main frame 12 and which serve to laterally position the associated track frames and endless tracks from the main frame of the vehicle to increase the normal tread dimension of the machine.

FIG. 9 illustrates more clearly the construction of the extension arms as well as their cooperative relationship with the main frame and with the track frames. In this figure, the main frame is indicated generally by the reference character 25 and will be seen to include a pair of mounting plates 26 and 27 on each side of the main frame and rigidly secured thereto as by welding. Each mounting plate is provided with a plurality of holes such as those indicated by the reference character 28, in the marginal areas of the plates to receive fastening bolts and each plate is further provided with a combined guide and shear pin 29 and 30, the purpose of which will be presently apparent.

The extension arms in FIG. 9 are indicated generally by the reference characters 31 and 32 and each will be seen to comprise a hollow beam having similarly formed opposite side walls 33 and 34, a top wall 35 and a bottom wall 36. Preferably, these several portions forming the hollow beam are formed of plate and welded together to form an integral and rigid structure. Each side wall has an outboard end portion of generally rectangular form as indicated by the reference character 37 and is of greatest height at its inboard end 38, tapering from the outboard end 37 toward the inboard end on its upper side, substantially as is shown. Thus, each beam is of greatest height or depth at its inboard end and the inboard end of each arm is provided with a mounting plate, such as those indicated by the reference characters 39 and 40 in FIG. 9, of a size corresponding to their associated mounting plates 26 and 27 on the main frame of the vehicle and provided with similarly positioned openings, such as those indicated by the reference character 41, so as to register with the openings in the mounting plates 26 and 27 and to pass therethrough suitable retaining bolts whereby the extensions are rigidly mounted upon the main frame of the vehicle.

The track frame is also illustrated in FIG. 9 and is indicated generally therein by the reference character 42. As will be seen, each track frame assembly 42 includes a pair of side rails 43 and 44 rigidly interconnected by means of the hollow, tubular members 45 and 46. The inside dimensions of each of the tubes 45 and 46 are such as to snugly receive the outboard ends 37 and 47 of the extension arms 31 and 32, as will be more specifically described hereinafter. Although not shown, the track frame assemblies 42 are so constructed as to mount the driving sprocket, the idler sprocket and the idler rollers which mount the endless tracks on the frames, which is accomplished in an entirely conventional manner. Only those portions of the track frames are shown in detail as is sufficient to illustrate the novel manner of connection between the track frame and the main frame of the vehicle by virtue of the arm extensions 31 and 32, which forms this invention.

As shown most clearly in FIGS. 6 and 7, the outboard connection between the extension arms and track frames is accomplished by the previously mentioned reception of the outboard end 37 of the extension arms within the tubular portions 46 of the track frames. The bottom wall 36 of the arm extension shown in FIGS. 6 and 7 is provided with openings registering with openings in the bottom wall 50 of the associated tubular member 46 and through which a plurality of fastening bolts 51 are passed so that the connection is effected between the track frame and the arm. This establishes a very rigid connection between the arms and the track frame such as is required to assure a maximum of rigidity and absence of stress localizations which might cause premature breakage. FIG. 7 best illustrates the telescopic engagement between the outboard end 37 of the extension arm 32 and the associated tube 46 of the track frame. From this, it will be readily apparent that the tubes 45 and 46 serve not only the function of rigidly interconnecting the side rails 43 and 44 but also as a means for interconnecting the extension arms with the track frames.

FIG. 8 illustrates the assembled relationship existing between the main frame of the vehicle 25 and one of the extension arms 32. In this figure, it will be seen that the mounting plates 27 and 40 are in abutting, face-to-face relationship with their openings 28 and 41 in register and receiving fasteners 60 therethrough, serving to maintain these plates in fixed face-to-face relationship.

The combined shearing and guide pin 30 will be seen to pass completely through the mounting plate 27 to which it is rigidly secured as by means of a weld 61 and to pass through an opening 62 in the mounting plate 40, and within which opening the pin is snugly received. The purpose of this is not only to aid in initially mounting the arm relative to the main frame, but also to relieve the fasteners 60 of shear loads during use and operation of the machine.

A glance at FIG. 2, for example, will clearly establish the fact that the extension arms utilized are mounted in cantilever fashion and thus are subjected to the heaviest stress concentrations at their point of juncture with the main frame, or in other words, at the mounting between the plates 27 and 40. Extensive experimentation has shown that this is a highly critical area and in order to insure longevity of the mechanism, the shear pins, such as those illustrated in FIG. 8 and designated by the reference character 30 therein, are extremely helpful in preventing premature breakage or fracture in any part of the machine, particularly the fastening element 60 serving to mount the extension arms to the mounting plate of the main frame. This pin 30 relieves the bolts 60 of excessive shear forces, such as might easily occur during operation of the machine in rugged terrain, a condition which is quite prevalent in practical usage of the machinery. Furthermore, the mounting between the extension arms and the track frames as is indicated best in FIGS. 6 and 7, serves to assure a tight and rigid mounting between these members and one which is not subject to lost motion between these elements as might easily cause shock loading of various component parts of the machinery and particularly the extension arms which would also tend to cause premature breakage of the mechanism.

Although it is realized that the broad concept of providing means for increasing the tread dimension of a vehicle is not new, it is believed that the construction as set forth above and as is illustrated in the drawings forms a practical and economical means for effecting this end result.

Naturally, when the track frames and their endless tracks as mounted thereon are disposed in the laterally extended position, some means must be provided for effecting a drive to the drive sprocket of the track assembly. Although this forms no part of the present invention, such is accomplished by means of extension shafts 70 and 71 such as are diagrammatically illustrated in FIG. 5 of the drawings and which shafts are suitably mounted inboard on the main frame of the vehicle and outboard on the associated track frames through the medium of suitable bearing members so that the shafts are positively and properly located and supported for driving purposes, the drive being effected by any conventional or desirable means and which, it is repeated, forms no part of this particular invention.

I claim:

In an endless track vehicle having a main frame and track frames for movably supporting the vehicle, a pair of extension arms for mounting each track frame to the main frame of the vehicle in order to laterally extend the track frames relative to the main frame and thereby increase the tread of the vehicle, each extension arm being of hollow, tubular construction of generally rectangular configuration in cross section, each said arm having an outboard elongated connecting end portion of uniform height and width and thereafter tapering toward its inboard end from a smaller height to a larger height, a solid mounting plate rigidly affixed to the inboard end of each extension arm and being of a size to extend peripherally beyond the confines of the associated inboard end of the arm, each mounting plate being provided with a plurality of openings therein outwardly of the arm, each mounting plate also being provided with a bore therethrough within the confines of the arm, said main frame having a shear pin rigidly affixed thereto snugly received within each such bore, means mounting the outboard ends of said arms to said track frames, each track frame including a pair of vertical side members disposed in spaced apart relationship, a pair of generally rectangular hollow tubular members extending between and through said side members with their opposite end portions fixedly connected to said side members, said tubular members being disposed intermediate the top and bottom of said side members to rigidly interconnect said side members and maintain them in spaced apart relationship, said outboard elongated connecting end portions of said arms being telescopically disposed within said tubular members and rigidly affixed thereto.

References Cited in the file of this patent

UNITED STATES PATENTS

| | | |
|---|---|---|
| 1,589,943 | Cook et al. | June 22, 1926 |
| 1,875,052 | Ljungkull | Aug. 30, 1932 |
| 2,681,231 | Kondracki | June 15, 1954 |
| 2,763,330 | Potter | Sept. 18, 1956 |
| 2,803,474 | Wilson | Aug. 20, 1957 |